March 26, 1957 W. C. McEVERS 2,786,322
POWER MOWER BLADE
Filed Dec. 16, 1955
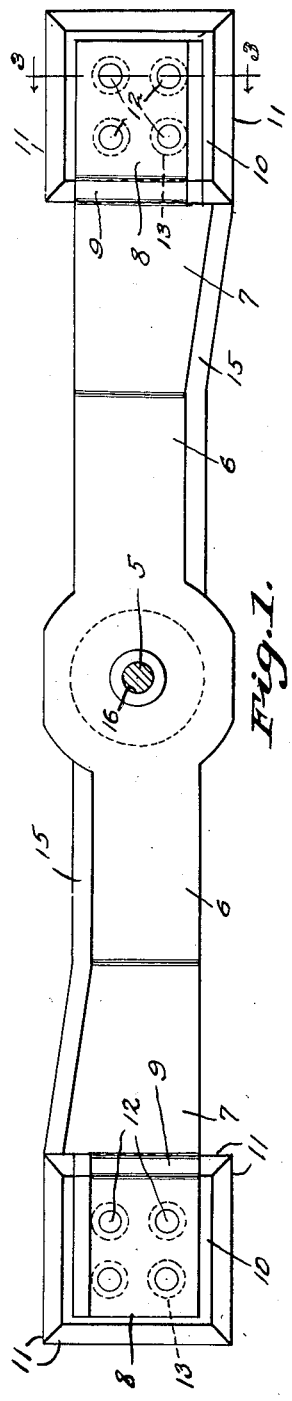
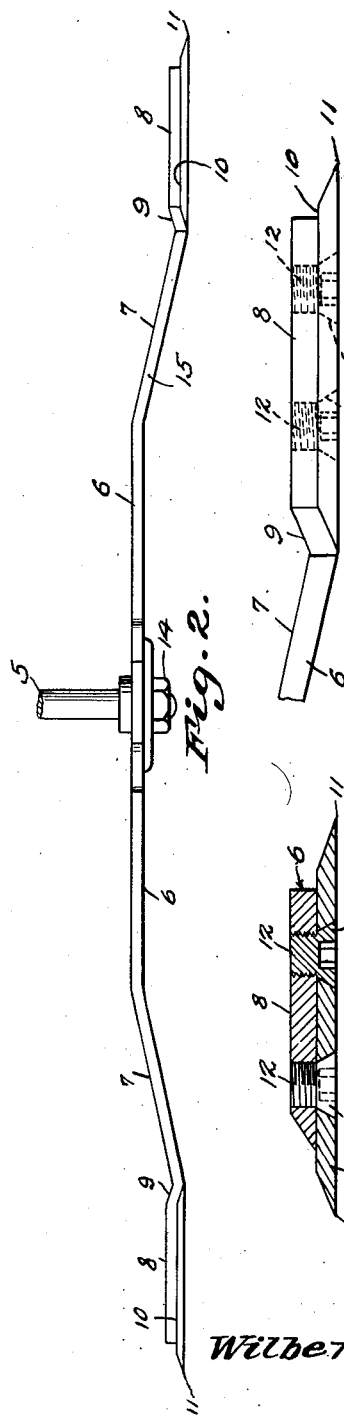
Wilber C. McEvers
INVENTOR
BY
ATTORNEYS.

United States Patent Office 2,786,322
Patented Mar. 26, 1957

2,786,322

POWER MOWER BLADE

Wilber C. McEvers, Winter Haven, Fla.

Application December 16, 1955, Serial No. 553,538

1 Claim. (Cl. 56—295)

This invention relates to power mower blade construction wherein the blades of the mower are carried by a cutter bar rotatable in a horizontal plane, portions of the edges of said cutter bar being beveled providing cutting blades.

The primary object of the invention is to provide a horizontally rotatable cutter bar wherein square blades are provided at each end thereof, each of which square blades has its ends beveled, providing four independent cutting blades or edges with one cutting edge located to provide a continuation of the adjacent cutting edge of the cutter bar, to the end that when a cutting edge or blade of a square blade becomes dull, the blade may be readily removed and repositioned with respect to the cutter bar presenting a sharper cutting edge, thereby making it unnecessary to replace the entire cutter bar to provide a sharp cutter.

Another important object of the invention is to provide a mower wherein the cutter bar thereof is formed with offset ends, the offset ends accommodating the removable blades of the mower which are secured therein. The offset end portions of said cutter bar are of such depths that the innermost cutting edges of the square blades will fit flush against that portion of the cutter bar where the offset ends merge with the cutter bar, providing a structure wherein the cut vegetation will not clog and impair the cutting action of the blades.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a plan view of a cutter bar equipped with substantially square reversible cutter bar blades at the ends thereof.

Figure 2 is an edge elevational view thereof.

Figure 3 is an enlarged sectional view taken on line 3—3 of Figure 1.

Figure 4 is an enlarged fragmental elevational view illustrating one end of the cutter bar with a removable blade as secured in position thereon.

Figure 5 is an enlarged perspective view thereof.

Referring to the drawing in detail, the reference character 5 indicates the usual vertical shaft of a power mower, the shaft 5 providing a support for the cutter bar 6 of the mower, which operates in a horizontal plane. Portions of the leading edges of said cutter bar 6 are beveled at 15, providing cutting blades that terminate adjacent to the ends of said bar 6.

The cutter bar 6 is formed with downwardly offset portions 7 terminating in blade supporting ends 8. The portions of the ends of the cutter bar 6 where the blade supporting ends 8 merge with the cutter bar, are inclined upwardly at 9 so that the removable cutter blades 10 secured thereto, will be supported in horizontal planes.

These cutter blades 10 are rectangular in formation, as better shown by Figure 1 of the drawings, the edges of the cutter blades being beveled providing a plurality of cutting edges 11, the cutting blades being secured in position on the blade supporting ends 8 of the cutter bar 6, by means of the screws 12 that have countersunk heads 13 so that the heads of the screws lie flush with the lower surfaces of the cutter blades 10, providing a smooth surface at the lower sides of the cutter blades.

The cutting edges of the cutter blades 10 that are disposed adjacent to the offset portions 7 of the cutter bar, being beveled to rest against the inclined portions 9 as better shown by Figure 4 of the drawing, thereby avoiding an abrupt shoulder or space at the inner edges of the cutter blades 10 to impair the efficiency of the blades. It will also be noted that the cutting edges of the cutter blades 10, which are directed forwardly for mowing, form continuations of the beveled edges 15 of said cutter bar 6.

The cutter bar 6 is provided with a central opening 16 through which the lower end of the power shaft 5 extends, the lower end of the power shaft being threaded to receive the nut 14, whereby the cutter bar may be readily and easily removed or replaced in case of damage.

From the foregoing, it will be seen that due to the construction shown and described, I have provided a cutter bar wherein the ends thereof are offset to receive square cutter blades 10, which cutter blades present four cutting edges.

It is obvious that when the leading cutting edges of the cutter blades become dull, it is only necessary to remove the cutter blades by removing the screws 12 and rotating the cutter blades to bring a sharp cutting edge into registry with the beveled cutting edge of the cutter bar 6, adjacent thereto. The screws 12 will now be replaced to secure the adjusted plates 10 to the ends of the cutter bar 6.

It might be further stated that the cutter bar 6 is rapidly rotated in operation, and that the exceptionally sharp cutter blades 10 will accomplish the mowing operation, slightly in advance of the beveled cutting edges of the cutter bar.

Having thus described the invention, what is claimed is:

A mower cutter bar comprising a flat bar having a central opening adapted to be secured to the lower end of the vertical power shaft of a mower, said bar comprising a horizontal central portion, an intermediate downwardly inclined portion extending obtusely from said central portion, an outer horizontal portion and an upwardly and outwardly inclined connecting portion extending obtusely from said intermediate portion, the leading edges of said central and intermediate portions being beveled to provide cutting edges, a rectangular blade having beveled marginal edges, one beveled edge of said blade bearing against the lower side of said connecting portion, and means securing said blade to the lower side of said outer horizontal portion.

References Cited in the file of this patent

UNITED STATES PATENTS 2,530,041    Bennett _____ Nov. 14, 1950
2,592,755    Soenksen _____ Apr. 15, 1952